United States Patent
Kornek-Percin et al.

(10) Patent No.: US 10,291,287 B2
(45) Date of Patent: May 14, 2019

(54) TRANSMISSION ARRANGEMENT FOR TRANSMITTING DATA WITHIN AN AIRCRAFT, AND AIRCRAFT

(71) Applicant: DIEHL AEROSPACE GMBH, Ueberlingen (DE)

(72) Inventors: Beatrice Kornek-Percin, Uhldingen-Muehlhofen (DE); Goetz Wolk, Ueberlingen (DE); Sven Gastel, Ueberlingen-Hoedingen (DE); Oliver Pluczinski, Ueberlingen (DE); Benno Petersen, Herdwangen (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 15/941,232

(22) Filed: Mar. 30, 2018

(65) Prior Publication Data
US 2018/0287666 A1 Oct. 4, 2018

(30) Foreign Application Priority Data
Mar. 31, 2017 (DE) .................. 10 2017 003 137

(51) Int. Cl.
*H04B 3/54* (2006.01)
*H04B 3/56* (2006.01)
*H04L 29/08* (2006.01)

(52) U.S. Cl.
CPC .............. *H04B 3/542* (2013.01); *H04B 3/56* (2013.01); *H04B 2203/5441* (2013.01); (Continued)

(58) Field of Classification Search
USPC ........................................... 375/257
See application file for complete search history.

(56) References Cited

U.S. PATENT DOCUMENTS 9,819,393 B2 * 11/2017 Vijayasankar ......... H04B 3/542
2009/0228223 A1 * 9/2009 Liu ....................... G01R 31/008
702/59
(Continued)

FOREIGN PATENT DOCUMENTS

DE 69115362 T2 5/1996
EP 1487128 A1 12/2004

*Primary Examiner* — Eva Y Puente
(74) *Attorney, Agent, or Firm* — Scully Scott Murphy and Presser

(57) ABSTRACT

A transmission arrangement for an aircraft for transmitting data within the aircraft, wherein the aircraft includes an electrical wiring system of coherent lines for providing electric power for loads in the aircraft, has at least two PLC elements, connectable to a respective one of the lines, for transmitting the data between at least two of the PLC elements via the wiring system, wherein at least one of the PLC elements has at least one filter connection, wherein the filter connection has at least one PLC connection, connectable to a respective one of the lines, and a power connection, connectable to a respective one of the lines, wherein the PLC connection carries power and data and the power connection carries power and is free of data. In an aircraft having a transmission arrangement and having at least one wiring system, all the lines leading away from a coherent subsection of the wiring system have a PLC element having a filter connection, and the lines leading away are attached to a data-free PLC connection of the filter connection of the PLC element attached thereto such that the subsection of the wiring system is a data-carrying subsection that is delimited from the rest of the wiring system in terms of the data.

22 Claims, 3 Drawing Sheets

(52) U.S. Cl.
CPC ............... *H04B 2203/5445* (2013.01); *H04B 2203/5491* (2013.01); *H04L 67/12* (2013.01)

(56) References Cited

U.S. PATENT DOCUMENTS

| | | |
|---|---|---|
| 2009/0252208 A1 | 10/2009 | Frye, Jr. |
| 2011/0134976 A1* | 6/2011 | Fossion ................. H04B 3/548 375/222 |
| 2014/0177738 A1 | 6/2014 | Alshinnawi et al. |

* cited by examiner

TRANSMISSION ARRANGEMENT FOR TRANSMITTING DATA WITHIN AN AIRCRAFT, AND AIRCRAFT

BACKGROUND OF THE INVENTION

The invention relates to a transmission arrangement for an aircraft for transmitting data within the aircraft and to a corresponding aircraft.

DISCUSSION OF THE PRIOR ART

Practical experience reveals that with every new range of aeroplane the wiring complexity, and hence the weight of cable mass, increases. New systems are integrated that produce and consume more data. The data are transmitted either via a network bus such as ARINC-664 (A664) or via other media, such as CAN, ARINC-429, or discrete and analogue lines. The electrical system has also become more complex by virtue of the range of voltages increasing (for example 28V DC, 115V AC, 230V AC or 270V DC).

It is the practice in avionics to separate data lines from electrical networks for supplying power. Devices are then both connected to an electrical power network and additionally wired with data lines. The number of data lines on a device can vary in this case.

With power line communication (PLC) technology, a large proportion of these data lines can be dispensed with by virtue of not only power being transmitted but also communication being effected via the electrical line. The use of PLC engineering in aeroplanes is known from the article 'Model based design of an avionics power line communications physical layer', Jürgen Wassner, Stephen Dominiak, Javier Moya, Lucerne University of Applied Sciences & Arts, Lucerne, Switzerland", for example. Owing to PLC technology, power lines are also used for transmitting data on them and therefore for saving weight.

SUMMARY OF THE INVENTION

The present invention is directed to an improved use of PLC technology in an aircraft.

The transmission arrangement in accordance with the present invention is used for transmitting data within the aircraft. A corresponding aircraft has an electrical wiring system in the form of a power distribution network. The wiring system comprises at least one, but normally multiple or a multiplicity of coherent, line(s). The wiring system is used for providing electrical power for loads in the aircraft. The transmission arrangement includes at least two PLC elements. Each of the PLC elements is connectable to at least one respective one of the lines of the wiring system. At least two of the PLC elements are used for transmitting the data between the PLC elements via the wiring system. Data are thus supplied to one of the PLC elements, coupled into one of the lines of the wiring system from the PLC element, transmitted via the wiring system to the other PLC element, coupled out of the line thereat by the PLC element and can then be forwarded or used from the PLC element, etc.

At least one of the PLC elements has a filter connection and is therefore in particular a filter or a node, as are explained below.

The filter connection is formed by or has at least one PLC connection and at least one corresponding power connection. By means of the PLC connection, the PLC element is connectable to one of the lines of the electrical wiring system in order to integrate the PLC element into the electrical wiring system that is present and to be able to use PLC communication (power and data) on the lines connected thereto. By means of the filter connection, the PLC element is connectable to one of the lines of the electrical wiring system in order to integrate the PLC element into the electrical wiring system that is present and to be able to use power transmission (only power, no data) on the line connected thereto. Within the PLC element, power is transported between at least one of the PLC connections and at least one corresponding instance of the power connections through the PLC element. No data transmission in the wiring system thus takes place at the power connection. In other words, the PLC element is connectable to the lines or the electrical wiring system in order to couple data at the PLC connection into or out of said electrical wiring system only on one side, but to transport power between PLC connection and power connection on both sides. For the power carried in the lines, the PLC element has a filter connection carrying power on both sides on the wiring system. For the data carried in the line, the PLC element carries data only on one side at the filter connection and is configured so that the lines are free of data on one side.

In other words, power transported on the line can pass through the PLC element bidirectionally. Data cannot pass through the PLC element, however, but rather any data transmission in the wiring system ends at the PLC connection of the PLC element. Within the wiring system, the filter connection thus forms a barrier for data and divides the wiring system into two sections, no data being present on the first section (at the power connection). Data can be present only on the second section (at the PLC connection) in order to reach the filter connection in the wiring system.

The aircraft is in particular an aeroplane, helicopter or UAV (Unmanned Aerial Vehicle). The wiring system has at least one line. If the wiring system has multiple lines, these are coherent, that is to say that an electrical line connection exists from each first or each second point in the wiring system via respective lines and possibly also intermediate elements such as connectors, electrical circuits, modules, etc., which are parts of the wiring system.

PLC elements can have no data interfaces (e.g. filters), one data interface or multiple data interfaces. For example, the data interfaces are designed for different protocols, network systems, data components, etc., that is to say that different data lines/data channels can be connected to different data interfaces, e.g. one data interface is designed for a CAN bus, another for Ethernet communication and another for an A429 connection. The PLC elements can also have one or more power and/or PLC connections, so that the PLC element is simultaneously connectable to lines for different system voltages or different voltage forms, for example, such as DC voltage or AC voltage. In the case of multiple connections, at least one of the line connections, that is to say the power or PLC connections, to which the wiring system is connectable in the case of a filter or a node (see below), is then a power connection and at least one is a PLC connection.

At the filter connection, "separation" of the wiring system thus takes place or said wiring system is routed through the filter connection. The power and PLC connections are thus two partial connections of the filter connection for receiving a respective end of a line. Power pass-through between the partial connections is possible. Data are present only at one of the partial connections on the line, however. The other partial connection is configured to be free of data. This thus has only the electric power present at it, without any data information. Between the power and PLC connections, pass-through of the power transported on the line is thus effected, possibly with branch-off for the individual demand of the respective PLC element or possibly to further loads. Data pass-through in the wiring system does not take place, however. For data communication purposes, the filter connection thus forms a termination or filter for the data-carrying subsection of the wiring system.

According to the invention, at the location of the filter connection, the PLC communication (data and power on the line) is separated from the rest of the electrical network (only power, no data). According to the invention, dedicated propagation of data is therefore effected only on one side of the filter, in particular only on a subsection of the electrical system between two or more filters (or nodes, see below) that have their data-carrying sides (PLC connections) facing one another.

The invention is based on the insight that PLC data in a conventional electrical network propagate throughout the network. Anyone can access the data anywhere in principle. According to the invention, on the other hand, dedicated propagation of data is effected only on one side of a filter (or node, see below) or between filter connections, that is to say only in a subsection of the electrical wiring system. The filter connection separates PLC networks or network parts from purely electrical networks or network parts. The PLC network is thus delimited at the filter connection, and no further data traffic occurs "on the other side" of the filter connection. Therefore, in an aircraft, conventional aircraft networks (in which power and data are separate) can be connected to a PLC network according to the invention or to the arrangement according to the invention.

In a preferred embodiment, at least one of the PLC elements is a filter that has no data interface for inputting and/or outputting the data and at least one filter connection (20). In other words, a filter includes only the filter connection. A "filter connection", in the form of a PLC element, can thus also be referred to as a "filter".

In a preferred embodiment, at least one of the PLC elements is a node. The node has at least one data interface. The node also has at least one filter connection as described above for the filter. The node thus corresponds to a filter, but with a data interface or with the functionality to couple data into or out of the wiring system via the data interface and the PLC connection. Pass-through of data in the wiring system does not take place, as described above, but pass-through of power does. Such a node is used as a filter to separate the actual PLC network, or the subsection, carrying data and power, from the conventional electrical wiring system, carrying only power, and prevent propagation of data, but to allow electric power to pass. At such a node, it is thus possible for a spur line of the data network to be realised for data communication purposes, at which spur line the data traffic in the wiring system ends or is introduced from or into said wiring system by means of the data interface, but the electrical routing of power in the wiring system is continued.

Such a data interface is used for inputting or outputting (differently from the wiring system) data to the relevant PLC element that has said data. The data interface may, but does not have to, be a physical "connection", but may also be another opportunity for data interchange, e.g. a physical or logical or virtual interface. The data interface may thus be any opportunity for data interchange. At any rate, data can be received there for further processing or handed over there for transmission.

During operation of the arrangement, data are thus transmitted between the data interface of the node and an applicable remote station in the form of a second PLC element and, in the process, take the path from the data interface via the node, that portion of the wiring system that connects the node to the other PLC element, via the other PLC element and, therein, possibly to the data interface thereof or are processed internally in the other PLC element. The data can also be transported in the other direction.

The applicable remote station or the PLC element for data interchange with the node may be either a further node or any other PLC element that can send and/or receive data.

In a preferred embodiment, at least one of the PLC elements is a client. The client, like the node, has at least one data interface. The client also has at least one PLC connection, but no power connection. The client therefore forms a PLC element that is universal for the wiring system (when there are multiple line connections), i.e. carries data on all sides and is equipped for coupling data into and/or out of the wiring system. In particular, the client can have only one or multiple one-sided terminal connections for line connections. The respective terminal connection is then a single PLC connection that has no corresponding opposite connection for passing power through the client. The client is then configured only to receive a respective spur line end. At the terminal connection, no pass-through of power or data in the wiring system thus takes place. Only data can otherwise leave or reach the client at a (pure) data interface. The client is then a terminating element for the wiring system in the form of a spur line. The terminal connection or the power supply line thus carries data and power. The terminal connection consumes or extracts the data from or supplies them to the wiring system.

In a preferred embodiment, at least two of the PLC elements are configurable for reciprocal data interchange for a data channel that is or is being used for transmitting the data via the wiring system. In particular, the data channel is configurable in terms of its frequency band used for transmitting the data on the wiring system. In particular, the frequency and/or the bandwidth of the frequency band is/are configurable. It is therefore possible to stipulate in which frequency range this particular data transmission takes place and also what bandwidth, that is to say data capacity, is available to this data or communication channel for transmission within the wiring system.

In a preferred embodiment, at least one of the PLC elements has at least two different data interfaces. At least two or each group of identical data interfaces that is provided for reciprocal communication has an assigned separate, different or segregated data channel, in particular frequency band, in the transmission arrangement for the purpose of transmitting the data via the electrical wiring system. As such, the electrical wiring system can carry at least two parallel, virtual data channels, each of the data channels being associated with a group of identical data interfaces. Thus, parallel virtual data networks on which data traffic is possible individually and in a manner segregated from one another arise on the electrical wiring system. In this case, a single PLC element or different PLC elements can each have different data interfaces.

In a preferred embodiment, at least one of the PLC elements has its power and/or PLC connection configured for inductively and/or capacitively coupling the data into/out of the line. Each of the "capacitive" or "inductive" connection concepts affords respective advantages and disadvantages that are known generally from electrical engineering.

In a preferred variant of this embodiment, at least one of the PLC elements is a node that has its power and/or PLC connection configured for inductively coupling the data into/out of the line. For nodes, the inductive coupling in/out is particularly advantageous, since this allows the pass-through of power, but the delimiting of the data on one wiring system side, to be realised in a particularly simple fashion.

In a preferred variant of this embodiment, at least one of the PLC elements is a client. The client has its PLC connection configured for capacitively coupling the data into/out of the line. Since clients cause no data delimitation on the line, the capacitive data coupling is particularly advantageous in this case.

In a preferred embodiment, at least one of the PLC elements has a gateway functionality and/or router functionality and/or filter functionality. Such PLC elements can be used to realise conventional or known data network structures on the respective PLC subsection of the wiring system.

The present invention is also directed to an aircraft including a transmission arrangement described above and also at least one of the electrical wiring systems mentioned in connection with this transmission arrangement. A coherent subsection of the electrical wiring system is a data-carrying subsection that has the data delimited from the remainder of this wiring system. This is achieved by virtue of all the lines leading away from a coherent subsection, i.e. each of the lines that lead away, each including a filter or node, as has been described above. In particular, two of these PLC elements are nodes. The electrical lines leading away from the subsection are in each case attached to the respective data-free power connection of the relevant filter connection of the applicable PLC element (filter or node).

In the aircraft according to the invention, all the parts of the wiring system that do not belong to the subsection are thus free of data in terms of the data that are present in the subsection. In particular, all the PLC clients that belong to the subsection are within the subsection; by contrast, only nodes or filters are present at the boundaries of the subsection when there are (pure power) lines routed out or in.

In a preferred embodiment, the subsection includes a line structure passing through between two PLC elements having a filter connection (node or filter), from which line structure if need be at least one line in the form of a spur line branches off, the end of which is terminated with a client or a filter. In particular, only a single continuous line is present between two PLC elements with the respective filter connection (node or filter). Branching off from the continuous line structure in the subsection, that is to say between the filter connections, are at the most lines in the form of spur lines, which, for their part, have their ends terminated with clients or filters. In particular, further PLC elements (in particular clients having more than PLC connection) are arranged within the subsection, that is to say not at the boundaries thereof.

The respective spur line ends at the terminal connections, the respective subsection ends at filter connections, the wiring system now being able to be continued there only with a line that carries power, but no data. As such, a particularly simple and easily realisable PLC subsection arises in the wiring system.

In a preferred embodiment, the wiring system includes at least two virtual data networks, in particular within the subsection. The data traffic within the virtual networks takes place in each case totally independently of one another or in a manner segregated from one another, so that the two networks are usable simultaneously or in parallel.

The two networks are within the wiring system or subsection in particular on the same line or on the same line section. The virtual network has maximum values stipulated for latency and variance, in particular for a transmission of the data from a first to a second PLC element. In particular, the networks have a low latency and a low variance. As such, networks with real time capability are realisable. The maximum latency ensures that data arrive at a receiver at a particular time, for example five milliseconds after sending. The variance (jitter) for this time is low and is one millisecond, for example, so that a total delay of four to six milliseconds is obtained for the data.

In a preferred embodiment, at least two data channels, in particular frequency bands, for the respective segregated transmission of data within the subsection are provided. As explained above, multiple virtual mutually independent data channels or networks are thus realisable within the subsection or else on a single physical line.

In a preferred embodiment, the wiring system has at least two separate subsections connected by at least one data-free line. In other words, at least two subnetworks exist in the electrical wiring system, these admittedly being electrically connected in respect of power to be transmitted, but not being able to communicate data to one another on the connecting lines or not touching and being totally separate. The two subnetworks are therefore independent of one another for data communication purposes and, in other words, form two "PLC islands" in the otherwise data-free electrical wiring system. A data cross-connection for the subsections is then necessary e.g. by means of a pure data line (no power transmitted) between two data interfaces in each of the subsections.

In a preferred embodiment, the aircraft includes at least one load that is actuated in particular by means of PLC technology. At least one of the PLC elements is an assembly integrated or integrable into the load. For such assemblies, particularly PLC clients are worthwhile, but other PLC elements are also realisable as integrable assemblies. By connecting the load to the integrated PLC element on the electrical wiring system, the load is therefore connected to the wiring system not only for power but also for data. The connection to one of the data-carrying lines automatically produces a (PLC) data interface to the wiring system or a network configuration. In this case, the type of network configuration depends on the integrated PLC element; for example, a data throughput on the line is obtained for a client, the end of a data line is obtained for a filter or a power throughput on the line is obtained for a node or filter. A load with an integrated PLC element is obtained that can be installed in particularly simple and uncomplicated fashion in the aircraft.

The invention is based on the following insights, observations and considerations and also has the embodiments that follow. As a partial simplification, the embodiments are also called "the invention" in this case. The embodiments can also include or correspond to parts or combinations of the embodiments cited above and/or possibly also include embodiments not mentioned hitherto.

The introduction of power line communication allows data to be transmitted over power lines. Hitherto, data and power were isolated by separate lines. Electrical data networks arise into which systems/individual components can couple data or from which data can be tapped off. This results in a weight saving as a result of the dedicated data lines being dispensed with, a reduction in line complexity and hence simplified installation of components. Particularly in the cabin area, for example in the case of a retrofit, this holds great advantages. Moreover, it is possible not only to use the advantages of power line communication for aeroplanes, but also to introduce power line communication in helicopters or UAVs.

According to the invention, a power line communication (PLC) architecture is obtained for aeroplanes, helicopters and UAVs or architectures that can be used therein. Flexible, capacitive and/or inductive coupling-in of PLC elements having different digital interfaces that communicate on the same electrical line is obtained. In this case, different data signals can be transmitted simultaneously and in a manner segregated from one another. With this PLC architecture, the PLC elements (in particular clients, nodes) can undertake different functions (for example gateway, routing, filtering). Configurability is obtained for distribution and availability of the volume of data in the form of bandwidth allocation over a virtual network using a configurable frequency range.

PLC elements having different, digital data interfaces that communicate on the same electrical line can be coupled in on a capacitively and/or inductively flexible basis. In this case, different data signals can be transmitted simultaneously and in segregated fashion. There is configurability for the distribution and availability of the volumes of data in the form of bandwidth allocation over a virtual network using a configurable frequency range. A PLC network according to the invention can also be extended, so that the systems can communicate over multiple PLC networks. In particular, the following PLC network components are obtained:

A PLC node is a small LRU (Line Replaceable Unit) in order to segregate two networks (gateway). The PLC node uses an inductive coupling method. The coupler changes depending on the currents and voltages of the electrical network, or couplers of different size are used.

A PLC client is an interface. A PLC client may be a single chip that is part of a device and is connected to the electrical network. The PLC client may alternatively be realised as a small LRU that is connected to an existing load via a data interface and therefore forwards only the data. The PLC client uses a capacitive method in order to connect to the PLC network (in particular wiring system).

A PLC filter is a standalone device that isolates an electric data network (in particular subregion) from a pure electrical system without data (in particular data-free section of the wiring system). The PLC filter is also part of the PLC node.

The PLC network according to the invention is distinguished from commercial PLC networks (domestic application) by special features: it affords robust and deterministic transmission with low latency and variance. Configurable data bandwidths of up to one gigabit per second can be achieved. In order to avoid perturbations on other networks, the PLC node segregates a PLC network from the conventional electrical network without data. In this PLC architecture, the PLC elements (in particular PLC clients or the PLC nodes) can undertake different functions (for example gateway, routing, filtering). This PLC network drastically simplifies the installation complexity, and also the complexity for re-equipment, and generates great advantages for the retrofit, such as for the cabin components of an aeroplane, for example, by virtue of the simple and fast installation during reconfiguration or redesign of the cabin elements. In existing aeroplanes or helicopters or UAVs too, this new technology can be incorporated into existing electrical systems and hence result in weight savings.

BRIEF DESCRIPTION OF THE DRAWINGS

Exemplary embodiments of the invention are explained in more detail below with reference to the accompanying figures, in which, in a schematic block diagram.

DETAILED DESCRIPTION OF THE INVENTION

Figure 1:
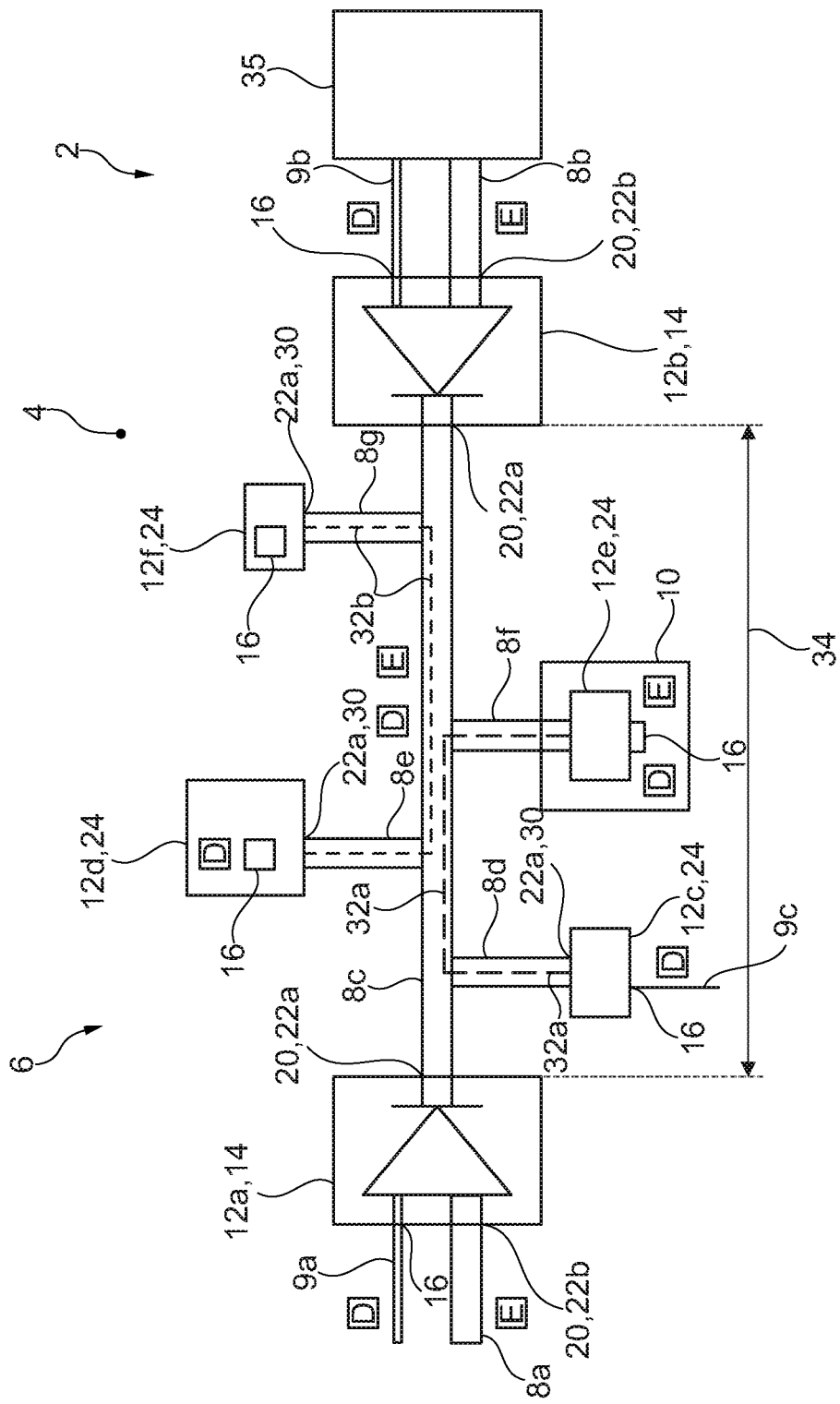
FIG. 1 shows an aeroplane with an electrical wiring system and PLC subsection.

FIG. 1 uses symbolic indication to show a transmission arrangement 2 for an aircraft 4, in this case an aeroplane, in which the transmission arrangement 2 is installed. The aircraft 4 includes a wiring system 6, multiple lines 8a-g of which are depicted as a detail in FIG. 1. The wiring system 6 is used primarily for distributing power E in the aircraft 4 to loads 10, only one of which is depicted by way of example. Data D are transmitted in the aircraft 4 primarily by data lines 9a,b. The data lines 9a,b are pure data lines for the exclusive transport of data D, but not of power E. The lines 8a,b are pure power lines that are used exclusively for forwarding power E, but not data D.

The lines 8c-g correspond physically to the lines 8a,b, that is to say are originally useful for transporting power E, but owing to "added" PLC technology also transport data D. In example, the transmission arrangement 2 includes six PLC elements 12a-f for transmitting the data D between some of the PLC elements 12a-f via the wiring system 6 or the lines 8c-g thereof. The PLC elements 12a,b are nodes 14, and the PLC elements 12c-f are clients 24.

The nodes 14 include one data interface 16 each in order to supply the data D to the node 14 from outside the wiring system 6 on the data lines 9a,b or to take said data away from said node. Moreover, they have line connections in order to connect the nodes 14 to the wiring system 6: the nodes 14 have a PLC connection 22a and a power connection 22b each. The PLC connection 22a and the power connection 22b of one of the nodes form a filter connection 20 each on this node 14. In respect of the power E carried in the lines 8a-c, PLC connection 22a and power connection 22b each carry power. The power E thus passes through all the line sections 8a,b,c, which together form a continuous line structure, unimpeded. Power E is thus carried from the line 8a,b, in each case by the filter connection 20 carrying power on both sides, to the line 8c, or vice versa. In respect of the data D, the filter connection 20 is embodied to carry data on one side, namely at the PLC connection 22a, and to be free of data on the other side of the filter connection 20, the power connection 22b. Although data D can pass through the filter connection 20 at the PLC connection 22a, i.e. can be interchanged between node 14 and line 8c, they cannot pass through at the power connection 22b. The data D thus cannot get from the node 14 or the line 8c to the line 8a,b, and vice versa. On this "side" of the node 14, the data D are therefore routed via the separate data interface 16 using the data line 9a,b.

In particular, data D on the power-carrying lines are interchangeable only between the line 8c and the node 14 and have to leave the line at the node 14 to the data line 9.

In the wiring system 6, a subsection 34 denoted by a double-headed arrow is thus a data-carrying subsection 34, all the lines leading away from the subsection 34, in this case the lines 8a,b, each being attached to a data-free power connection 22b of the respective filter connection 20 of the nodes 14. In the example, the subsection 34 is moreover formed by a single continuous line structure in the form of the line 8c between the PLC elements 12a,b, each of which has the filter connection 20. In between, there are only spur lines in the form of the lines 8d to 8g connected, which are connected to clients 24.

The rest of the electrical engineering 35 of the aircraft 4 is merely indicated. It is connected to the subsection 34 by conventionally separate wiring for power E (pure power line 8b) and data D (pure data line 9b) via the node 14.

The "barrier" for data in the node 14 in regard to the lines 8a,b in the direction from the subregion 34 is symbolised by a diode circuit diagram oriented in the reverse direction.

The clients 24 each have a data interface 16 and a PLC connection 22a. The PLC connection 22a is in this case a respective terminal connection 30 that is used only for receiving one of the lines 8d-g or line ends and hence terminates a respective spur line 8d-g of the wiring system 6. The terminal connection 30 is configured to carry data and to carry power. That is to say that power E and data D can each both enter and leave the PLC connection 22a of the clients 24.

The data interface 16 is depicted partly inside the client 24 (PLC element 12d) by way of example in this case and symbolises a virtual or real internal client interface if data D can also be processed inside the client. As shown using the example of the PLC element 12c, however, data D can also be passed through to a physical data interface 16 and be available or supplied outside the client 24. In or using the PLC elements 12, it is also possible for power E to be branched off from the wiring system 6 for the separate consumption of said PLC elements.

For the PLC element 12e, it is shown by way of example that the client 24 is integrated in the load 10 in order to supply it with power E and in order to provide said load with a data interface 16 inside the load for interchanging data D.

The possibility of data interchange of data D within the wiring system 6 in the form of a data channel is depicted in dashes. The two nodes 14 are each not involved in this data interchange, but rather it is effected between the PLC elements 12c and 12e, on the one hand, and between 12d and 12f, on the other hand. The PLC elements 12 are configurable for the reciprocal data interchange of the data D in view of the frequency band that is used for transmitting the data via the wiring system. As such, the PLC elements 12c,e use a first virtual channel, in this case a first frequency band, for data transmission, and the PLC elements 12d,f use a second virtual channel, in this case a second, different frequency band. As such, two virtual data channels or networks 32a,b arise on the single or same line 8c in particular, these being able to be used independently of one another without perturbing one another and nevertheless being implemented on the line 8c at the same time.

At the node 14, the filter connection 20 is configured for inductively coupling the data D into or out of the line 8c. The PLC connections 22a of the client 24, on the other hand, are configured for capacitively coupling the data D to the lines 8d-g.

Figure 2:
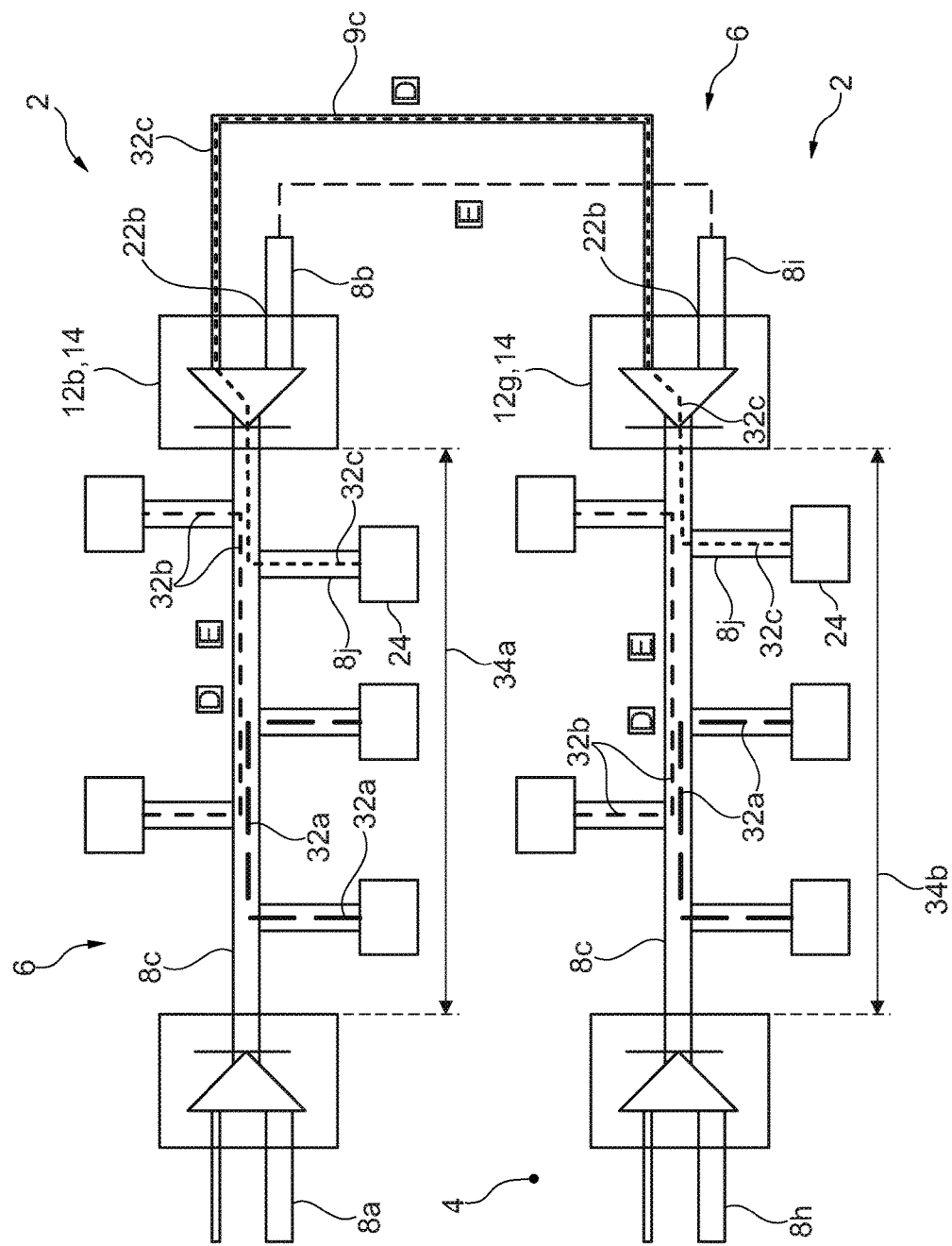
FIG. 2 shows an aeroplane with two wiring systems each having a subsection.

FIG. 2 shows an aircraft 4 that includes two separate wiring systems 6, each of which includes a subsection 34a,b. The wiring systems 6 each correspond, in principle or mutatis mutandis, to the one from FIG. 1 with the difference that one further spur line 8j each branches off from the line 8c, which is likewise terminated with a client 24. The upper wiring system 6 in FIG. 2 carries power E as a voltage of 28V DC, and the lower wiring system 6 carries power as a voltage of 230V AC. The two wiring systems 6 are not connected by power-carrying lines. Data communication or interchange of data D is nevertheless possible by virtue of data being interchanged on a separate data line 9c. To this end, a virtual data network 32c is formed. This uses a third data channel or frequency band in order also to keep this data communication independent of the virtual networks 32a,b of the respective subsections 34a,b in terms of data. The PLC elements 12b and 12g as node 14 each have a gateway functionality.

If, alternatively, the two wiring systems 6 were to carry the same voltage form, in this case 28V DC, it would also be possible for a single wiring system 6 to be set up by virtue of the lines 8b,i being connected or representing a single line 8 (indicated in dashes). This line 8 is then free of data owing to the connection to the respective data-free power connections 22b of the PLC elements 12b,g and transmits only power E. FIG. 2 then involves a single wiring system 6 that has two subsections 34a,b. Owing to the data-free connection, the two subsections 34a,b remain independent of one another in respect of data communication, however, apart from the virtual network 32c, which operates on the basis of the same principle, as described above.

Figure 3:
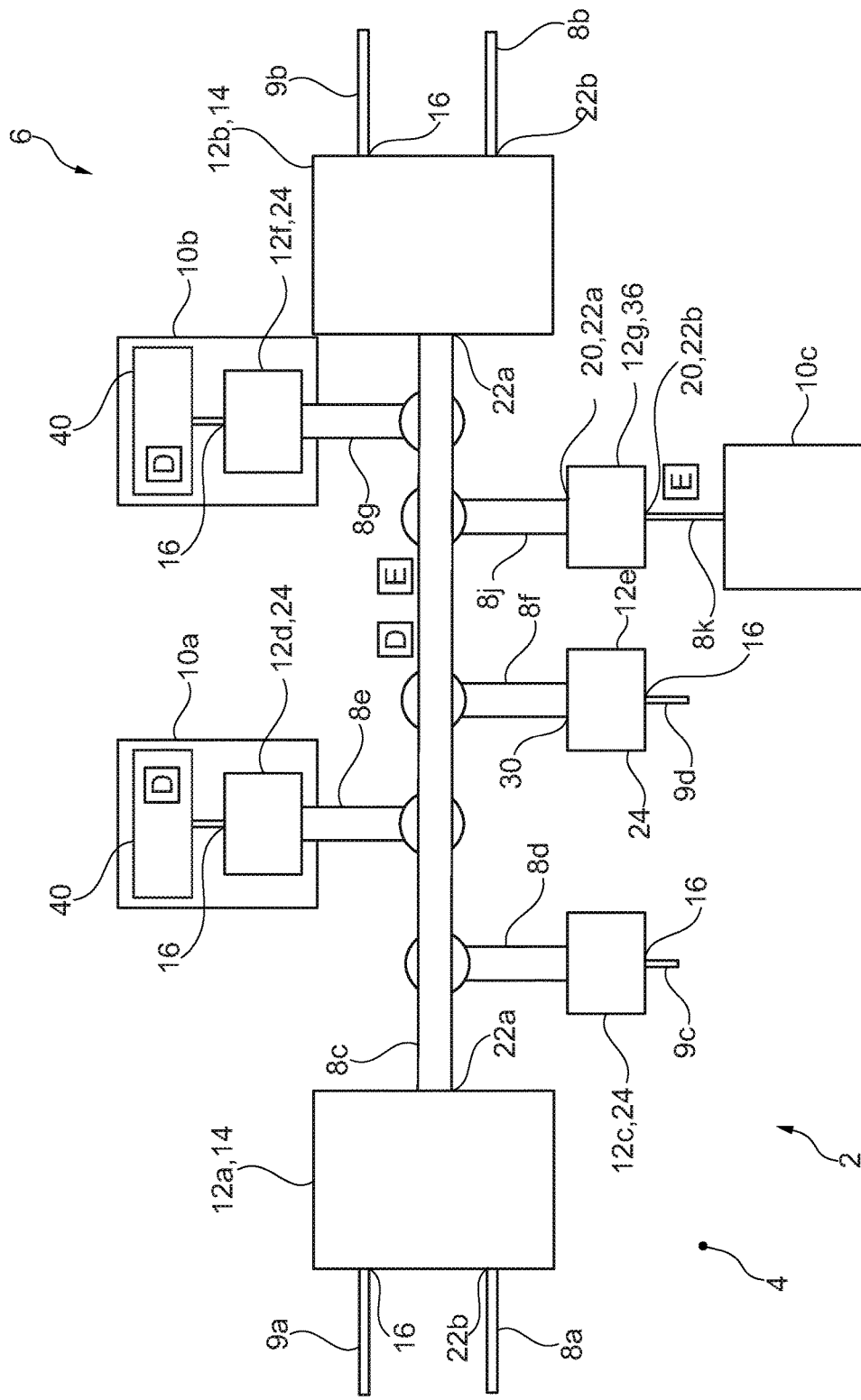
FIG. 3 shows an aeroplane with a wiring system and PLC subsection.

FIG. 3 shows a further alternative of a wiring system 6. In this case, a PLC element 12g is configured as a filter 36. The filter 36 has no data interface 16, but has a filter connection 20 whose PLC connection 22a is again designed to carry data and whose power connection 22b is again designed to be free of data. At the location of the filter 36, power E can therefore be branched off from the other wiring system 6 to a further line 8k of the wiring system 6 in a manner free of data in order to supply power to a load 10c.

FIG. 3 moreover shows loads 10a,b that have a respective client 24 integrated in them as an integrable assembly. The loads 10a,b are complex large loads, in this case two separate galleys of the aircraft 4, in this case a large-capacity aeroplane. The galleys have internal data networks in the form of CAN buses 40. The data interfaces 16 of the PLC elements 12d,f are therefore CAN bus interfaces in order to connect the CAN buses 40 to other components of the aeroplane via the wiring network 6 for the purpose of interchanging data D. The PLC elements 12c,e have data interfaces 16 in the form of A429 interfaces for the purpose of interchanging the data D with the data lines 9c,d, which are realised as a separate A429 data network using conventional technology.

LIST OF REFERENCE SYMBOLS

2 Transmission arrangement
4 Aircraft
6 Wiring system
8a-k Line
9a-d Data line
10 Load
12a-g PLC element
14 Node
16 Data interface
20 Filter connection
22a PLC connection
22b Power connection
24 Client
30 Terminal connection
32a-c Virtual network
34a,b Subsection
35 Electrical engineering
36 Filter
40 CAN bus
D Data
E Power

What is claimed is:

1. A transmission arrangement for an aircraft for transmitting data within the aircraft, wherein the aircraft includes an electrical wiring system of coherent lines for providing electric power for loads in the aircraft, the transmission arrangement comprising:
at least two PLC elements, connectable to a respective one of the lines, for transmitting the data between at least two of the PLC elements via the wiring system,
wherein at least one of the PLC elements comprises: at least one filter connection, wherein the filter connection has at least one PLC connection, connectable to a respective one of the lines; and at least one power connection, connectable to a respective one of the lines,
wherein the PLC connection carries power and data and the power connection carries power and is free of data, and
wherein at least two of the PLC elements are configurable for reciprocal data interchange for a data channel that is used for transmitting the data via the wiring system.

2. The transmission arrangement according to claim 1, wherein:
at least one of the PLC elements is a filter that has no data interface for input and/or output of the data and at least one filter connection.

3. The transmission arrangement according to claim 1, wherein:
at least one of the PLC elements is a node that has at least one data interface for input and/or output of the data and at least one filter connection.

4. The transmission arrangement according to claim 1, wherein:
at least one of the PLC elements is a client that has at least one data interface and at least one PLC connection and no power connection.

5. The transmission arrangement according to claim 1, wherein:
at least one of the PLC elements has at least two different data interfaces, and at least two identical data interfaces have an assigned separate different data channel for transmitting the data via the wiring system.

6. The transmission arrangement according to claim 5, wherein:
at least one of the PLC elements is a node that has its PLC and/or power connection configured for inductively coupling the data into/out of the line.

7. The transmission apparatus according to claim 5, wherein:
at least one of the PLC elements is a client that has its PLC connection configured for capacitively coupling the data into/out of the line.

8. The transmission arrangement according to claim 1, wherein:
at least one of the PLC elements has a gateway and/or router and/or filter functionality.

9. An aircraft comprising:
an electrical wiring system of coherent lines for providing electric power for loads in the aircraft; and
a transmission arrangement for transmitting data within the aircraft, wherein the aircraft includes, the transmission arrangement comprising:
at least two PLC elements, connectable to a respective one of the lines, for transmitting the data between at least two of the PLC elements via the wiring system,
wherein at least one of the PLC elements comprises: at least one filter connection, wherein the filter connection has at least one PLC connection, connectable to a respective one of the lines; and at least one power connection, connectable to a respective one of the lines,
wherein the PLC connection carries power and data and the power connection carries power and is free of data, and
wherein a coherent subsection of the electrical wiring system is a data carrying subsection that is delimited from the rest of the wiring system in terms of the data,
wherein all the lines leading away from the coherent subsection of the electrical wiring system have a PLC element having a filter connection, and the lines leading away are attached to a data free power connection of the filter connection of the PLC element attached thereto.

10. The aircraft according to claim 9, wherein:
the subsection includes a line structure passing through between two PLC elements having a filter connection, from which line structure if need be at least one line in the form of a spur line branches off, the end of which is terminated with a client or a filter.

11. The aircraft according to claim 9, wherein:
the wiring system includes at least two virtual data networks.

12. The aircraft according to claim 9, wherein:
at least two data channels for the respective independent transmission of data within the subsection are provided.

13. The aircraft according to claim 9, wherein:
the wiring system has at least two separate subsections connected by at least one data free line.

14. The aircraft according to claim 9, wherein:
the aircraft includes at least one load, and at least one of the PLC elements is an assembly integrated in one of the loads.

15. A transmission arrangement for an aircraft for transmitting data within the aircraft, wherein the aircraft includes an electrical wiring system of coherent lines for providing electric power for loads in the aircraft, the transmission arrangement comprising:
at least two PLC elements, connectable to a respective one of the lines, for transmitting the data between at least two of the PLC elements via the wiring system,
wherein at least one of the PLC elements comprises: at least one filter connection, wherein the filter connection has at least one PLC connection, connectable to a respective one of the lines; and at least one power connection, connectable to a respective one of the lines,
wherein the PLC connection carries power and data and the power connection carries power and is free of data, and
wherein at least one of the PLC elements has at least two different data interfaces, and at least two identical data interfaces have an assigned separate different data channel for transmitting the data via the wiring system.

16. The transmission arrangement according to claim 15, wherein:
at least one of the PLC elements is a filter that has no data interface for input and/or output of the data and at least one filter connection.

17. The transmission arrangement according to claim 15, wherein:
at least one of the PLC elements is a node that has at least one data interface for input and/or output of the data and at least one filter connection.

18. The transmission arrangement according to claim 15, wherein:

at least one of the PLC elements is a client that has at least one data interface and at least one PLC connection and no power connection.

19. The transmission arrangement according to claim 15, wherein:
at least two of the PLC elements are configurable for reciprocal data interchange for a data channel that is used for transmitting the data via the wiring system.

20. The transmission arrangement according to claim 15, wherein:
at least one of the PLC elements is a node that has its PLC and/or power connection configured for inductively coupling the data into/out of the line.

21. The transmission apparatus according to claim 15, wherein:
at least one of the PLC elements is a client that has its PLC connection configured for capacitively coupling the data into/out of the line.

22. The transmission arrangement according to claim 15, wherein:
at least one of the PLC elements has a gateway and/or router and/or filter functionality.

* * * * *